United States Patent
Popa

(10) Patent No.: US 7,770,972 B2
(45) Date of Patent: Aug. 10, 2010

(54) SEAT LUMBAR ACTUATOR

(75) Inventor: Radu Popa, Walled Lake, MI (US)

(73) Assignee: Lear Corporation, Southfield, MI (US)

( * ) Notice: Subject to any disclaimer, the term of this patent is extended or adjusted under 35 U.S.C. 154(b) by 118 days.

(21) Appl. No.: 12/243,540

(22) Filed: Oct. 1, 2008

(65) Prior Publication Data

US 2010/0078980 A1   Apr. 1, 2010

(51) Int. Cl.
*B60N 2/66* (2006.01)
(52) U.S. Cl. ............... 297/284.4; 297/284.7; 74/500.5; 74/501.5 R; 74/501.6
(58) Field of Classification Search ............. 297/284.4, 297/284.7, 363–365; 74/500.5, 501.5 R, 74/501.6, 502–504
See application file for complete search history.

(56) References Cited

U.S. PATENT DOCUMENTS

| | | | | |
|---|---|---|---|---|
| 4,136,577 | A | * | 1/1979 | Borgersen ............... 74/479.01 |
| 4,316,631 | A | * | 2/1982 | Lenz et al. ............... 297/284.1 |
| 5,197,780 | A | | 3/1993 | Coughlin |
| 5,217,278 | A | | 6/1993 | Harrison et al. |
| 5,449,219 | A | * | 9/1995 | Hay et al. ................ 297/284.4 |
| 5,567,011 | A | * | 10/1996 | Sessini .................... 297/284.7 |
| 6,050,641 | A | * | 4/2000 | Benson .................... 297/284.4 |
| 6,095,605 | A | * | 8/2000 | Lai ............................ 74/502.4 |
| 6,814,407 | B2 | | 11/2004 | Mundell |
| 6,983,990 | B2 | * | 1/2006 | McMillen ................ 297/284.4 |
| 7,007,568 | B2 | | 3/2006 | MacAulay et al. |
| 7,131,694 | B1 | | 11/2006 | Buffa |
| 7,338,124 | B2 | * | 3/2008 | McMillen ................ 297/284.4 |

* cited by examiner

*Primary Examiner*—Peter R. Brown
(74) *Attorney, Agent, or Firm*—MacMillan, Sobanski & Todd, LLC

(57) ABSTRACT

An actuator assembly for adjusting first and second comfort features of a seat assembly includes a housing and a shaft mounted for linear and rotational movement in the housing. A main gear is mounted on the shaft and mounted for rotational movement in the housing. The shaft and main gear are linearly movable between first and second positions relative to the housing. A first cable assembly includes a first pinion gear mounted for rotational movement in the housing. A first rack is mounted for linear movement in the housing. The first rack engages with the first pinion gear such that rotation of the first pinion gear linearly moves the first rack. A first cable is connected to the first rack. The first cable is adapted to be connected to a first comfort feature. A second cable assembly includes a second pinion gear mounted for rotational movement in the housing. A second rack is mounted for linear movement in the housing. The second rack engages with the second pinion gear such that rotation of the second pinion gear linearly moves the first rack. A second cable is connected to the first rack. The cable is adapted to be connected to a second comfort feature. When the main gear is in the first position, the main gear is engaged with the first pinion gear. When the main gear is in the second position, the main gear is engaged with the second pinion gear.

14 Claims, 3 Drawing Sheets
SEAT LUMBAR ACTUATOR

BACKGROUND OF THE INVENTION

This invention relates in general to seating systems and, more particularly, to an actuator device for selectively controlling independent adjustment of two comfort features integrated into the seating system.

Vehicle seats typically include a seat back and a seat cushion or bottom. The seat back is often pivotally mounted to the seat bottom via a recliner mechanism for adjusting the seat back to a desired inclined angle relative to the seat bottom. Known recliner mechanisms are either manually operated or may include a motor drive unit for electric operation. The seat bottom may also be configured to move the seat in fore and aft directions as well as in a generally vertical direction. Other comfort features include a lumbar mechanism mounted in the seat back. The lumbar mechanism is operated by the seat occupant to adjust the shape and contour of a portion of the seat back to provide a desired support level and comfort position for the seat occupant. Generally, the lumbar mechanisms are provided for altering the contour of a central region of the seat back. The lumbar mechanisms are generally mounted underneath the outer trim cover and foam pads of the seat back. Some lumbar mechanisms provide a fore and aft adjustment, as well as vertical adjustment of the lumbar mechanism. Conventionally, lumbar mechanisms which provide both fore and aft adjustment as well as vertical adjustment have two distinct control devices for permitting this independent adjustment. However, it also known to provide a mechanism actuated by a common handle for providing these two distinct adjustments. U.S. Pat. Nos. 5,197,780 and 5,217,278 disclose such mechanisms.

SUMMARY OF THE INVENTION

This invention relates to an assembly for adjusting first and second comfort features of a seat assembly. The assembly includes a housing and a shaft mounted for linear and rotational movement in the housing. A main gear is mounted on the shaft and mounted for rotational movement in the housing. The shaft and main gear are linearly movable between first and second positions relative to the housing. A first cable assembly includes a first pinion gear mounted for rotational movement in the housing. A first rack is mounted for linear movement in the housing. The first rack engages with the first pinion gear such that rotation of the first pinion gear linearly moves the first rack. A first cable is connected to the first rack. The first cable is adapted to be connected to a first comfort feature. A second cable assembly includes a second pinion gear mounted for rotational movement in the housing. A second rack is mounted for linear movement in the housing. The second rack engages with the second pinion gear such that rotation of the second pinion gear linearly moves the first rack. A second cable is connected to the first rack. The cable is adapted to be connected to a second comfort feature. When the main gear is in the first position, the main gear is engaged with the first pinion gear. When the main gear is in the second position, the main gear is engaged with the second pinion gear.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
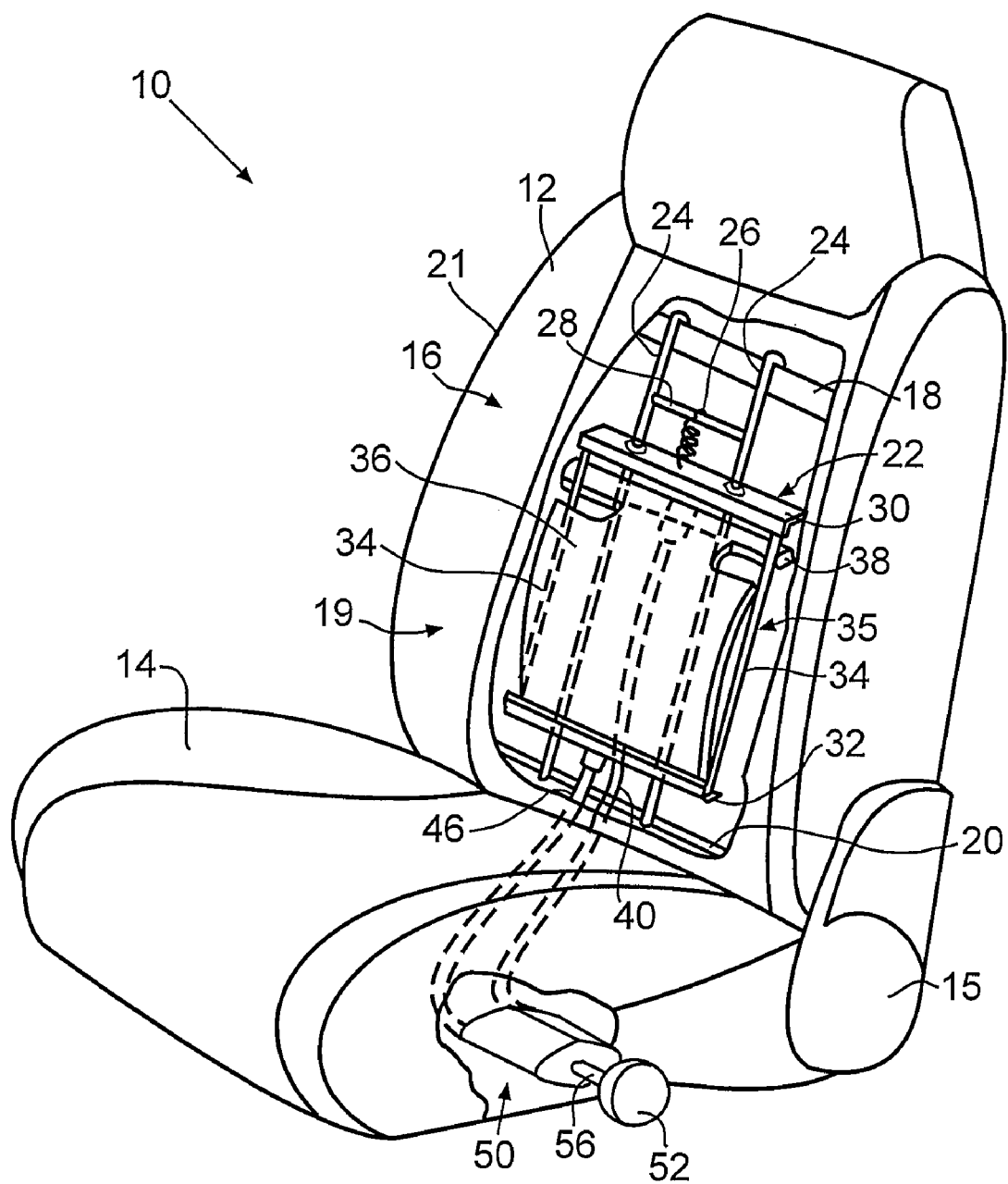
FIG. 1 is a perspective view of seat assembly including an adjustable lumbar mechanism controlled by an actuator assembly.

Referring now to the drawings, there is schematically illustrated in FIG. 1 a vehicle seat assembly, indicated generally at 10. The seat assembly 10 generally includes a seat back 12 and a seat bottom 14. The seat back 12 may be pivotally mounted to the seat bottom 14 via a recliner mechanism 15 for adjusting the seat back 12 to a desired inclined angle relative to the seat bottom 14. The recliner mechanism may be operated manually by a handle or may include a motor drive unit (not shown) for electric operation. The seat bottom 14 may be configured to move the seat assembly 10 in fore and aft directions as well as in a generally vertical direction relative to the vehicle floor upon which the seat assembly 10 is mounted.

The seat assembly 12 further includes a lumbar mechanism, indicated schematically at 16. As will be discussed in detail below, the lumbar mechanism 16 is actuated by operation of an actuator assembly 50. The lumbar mechanism 16 is operable to adjust the contour of a central portion 19 of the seat back 12 to provide a desired support level and comfort position for the seat occupant. Although the lumbar mechanism 16 is shown and described as being used for altering the contour of a central portion 19 of the seat back 12 it should be understood that the mechanism 16 can be configured and repositioned to alter any portion of the seat back 12 or other seat portions. The lumbar mechanism 16 is mounted on a frame 18 of the seat back 12. An outer trim cover 21 and a foam pad may cover the lumbar mechanism 16 and the frame 18.

The lumbar mechanism 16 includes a bracket assembly 20 provided for positioning and supporting a lumbar assembly 22 on the seat back frame 18. The bracket assembly 20 includes a pair of spaced apart vertically extending slide rails 24 which support the lumbar assembly 22 for a generally horizontal curvature adjustment and a generally vertical positional adjustment. A spring 26 is provided for biasing the lumbar assembly 22 toward a predetermined central position relative to the seat back 12. The spring 26 is coupled between a generally rigid cross rail 28 extending between the vertical slide rails 24 and an upper cross beam 30 of the lumbar support assembly 22. A lower cross beam 32 of the lumbar assembly 22 is interconnected to the upper cross beam 30 by a pair of vertical support beams 34 for defining a relatively rigid lumbar frame assembly 35 which is adapted for vertical sliding movement on slide rails 24.

A relatively rigid deflectable bow or lumbar member 36 extends across a portion of the width of seat back frame 18 and is fixedly secured at its lower end to the lower cross-beam 32. An upper free end 38 of lumbar member 36 is movable by means of a first actuation cable assembly 40 for selectively changing the degree of curvature of the lumbar member 36.

As will be discussed below, the first cable assembly 40 is operatively coupled between the lumbar member 36 and the actuator assembly 50 for causing curvature adjustment of the lumbar member 36 in response to actuation of the actuator assembly in a first operating mode position. The first cable assembly 40 may be in the form of a Bowden cable having an inner cable 44 slidably mounted in an outer sheath 45. One end of inner cable 44 is coupled to the free end 38 of the lumbar member 36 and the sheath is connected relative to frame assembly 35 such that axial movement of the inner cable via the actuator assembly 50 is operable to produce the curvature adjustment of the lumbar member 36.

A second actuation cable assembly 46 is operatively coupled between the lower cross-beam 32 of the lumbar frame assembly 35 and the actuator assembly 50 for causing a generally vertical positional adjustment of the curved lumbar member 36 in response to actuation of the actuator assembly 50 in a second operating mode, as will be discussed below. The second cable assembly 46 may be in the form of a Bowden cable having an inner cable 48 slidably mounted in an outer sheath 49. One end of the inner cable 48 is coupled to the lower cross-beam 32 of lumbar frame assembly 35 and the outer sheath 49 is connected relative to the frame 20 for causing the vertical positional adjustment of lumbar member 36 upon actuation of the actuator assembly 50. Thus, the actuator assembly 50 defines first and second operating mode positions for permitting independent actuation of first and second cable assemblies 40 and 46, respectively, for causing the corresponding curvature and positional adjustments of lumbar support mechanism 16.

The lumbar member 36 can be any suitable structure and have any desired shape which provides for support for the seat occupant. In the illustrated embodiment, the lumbar member 36 is a relatively flat flexible sheet having a bowed curvilinear shape. The lumbar member 36 may be formed from a single structure or may include a plurality of interconnected members. The lumbar member 36 may also include slots formed therein to accommodate the vertical support beams 34 or to provide flexibility to the lumbar member 36.

The actuator assembly 50 is preferably mounted on the seat 10 in a convenient location for the user or seat occupant. Due to the use of the first and second cable assemblies 40 and 46, the actuator assembly 50 can be remotely located from the lumbar mechanism 16. In one embodiment, the actuator assembly 50 includes a knob or handle 52 such that the actuator assembly is manually operated by the seat occupant or other user. It should also be understood that the actuator assembly 50 could be configured for motorized or electrical operation in which the handle 52 is moved by means of motorized or electrical mechanisms (not shown).

Figure 2:
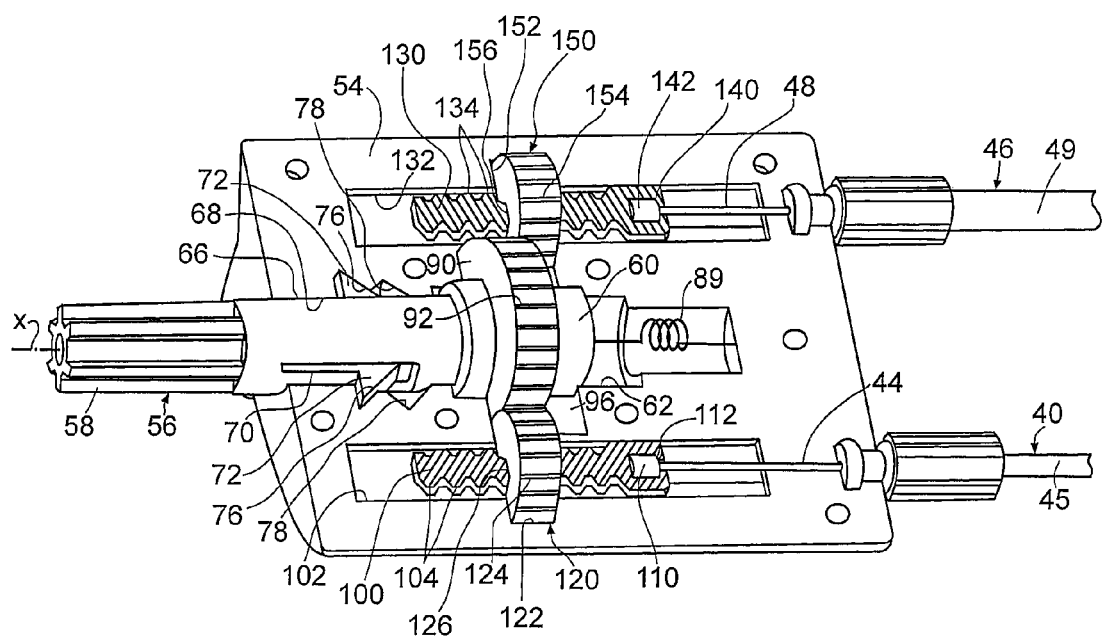
FIG. 2 is a partial cross-sectional view taken along lines 2-2 of FIG. 1 through the actuator assembly, wherein the actuator assembly is in a first operating position for controlling a first comfort feature of the lumbar mechanism.
Figure 3:
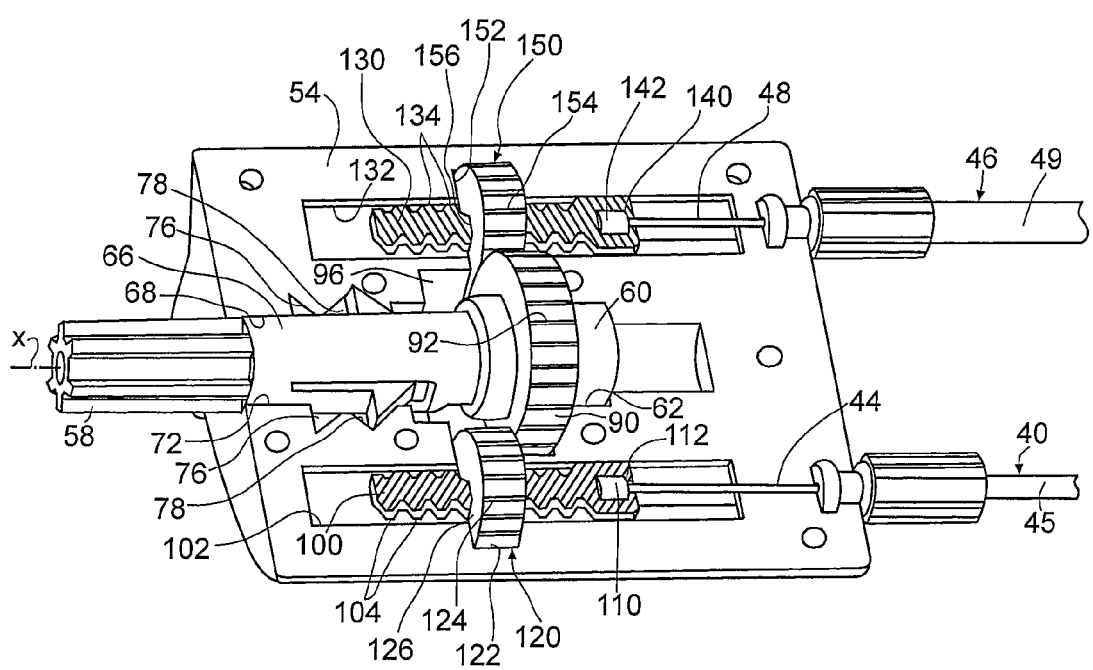
FIG. 3 is a cross-sectional view similar to FIG. 2, wherein the actuator assembly is in a second operating position for controlling a second comfort feature of the lumbar mechanism.

Referring to FIGS. 2 and 3, the actuator assembly 50 includes a housing 54 which may be formed from first and second housing halves, one of which is shown in the illustrated embodiment in FIGS. 2 and 3. The housing 54 can include features such as mating holes and pins to fasten the halves together. Use of first and second housing halves simplifies assembly and construction of various slots and grooves formed in the housing 54 for housing various components therein. Of course, it should be understood that the housing 54 can be made of any suitable number of components. The handle 52 is connected to a shaft 56 which extends into the housing 54. The shaft 56 may include splines 58 which mate with the handle 52 so that the handle 52 is fixed with the shaft 56 both in the rotational axis and a linear axis X defined along the length of the shaft 56. Thus, the shaft 56 may be rotated by the handle 56 as well as pulled or pushed along the axis X. The shaft 56 has an end 60 which is mounted for rotational and linear movement within a groove 62 formed in the housing.

A locking sleeve 66 is mounted around a central portion of the shaft 56. The locking sleeve 66 is preferably a generally tubular structure permitting rotational movement relative to the shaft 56. The locking sleeve 66 is mounted within a groove 68 formed in the housing 54 for linear movement along the axis X. The locking sleeve 66 functions as a detent mechanism for maintaining the shaft 56 and handle 52 in either a first operating position, as shown in FIG. 2, or a second operating position, as shown in FIG. 3. As will be explained below, the first operating position corresponds to actuation of the first comfort feature of altering the curvature of the lumber member 36, and the second operating position corresponds to actuation of the second comfort feature of altering the vertical position of the lumbar member 36. The locking sleeve 66 includes a pair of resilient fingers 70. Each of the fingers 70 includes an end having an outwardly extending tab 72. Depending on the operating position, the tabs 72 will be located in one of a first pair of slots 76 or a second pair of slots 78. The slots 76 and 78 have ramped surfaces such that the tabs 72 can be pushed or pulled out from the slots 76 and 78 by resilient flexing of the fingers 70 in a direction generally perpendicular to the axis X. It is noted that the slot 76 has a face which is generally perpendicular to the axis X such that the shaft 56 cannot be pulled completely out from the housing 54 during normal use of the actuator assembly 50. The actuator assembly 50 may also include a spring, indicated schematically at 89, which may bias the shaft 56 into either the first or second operating position.

A main gear 90 is fixedly mounted on the shaft 56 such that rotational movement or linear movement along the axis X will also correspondingly move the main gear 90. The main gear 90 is housed within a chamber 96 formed in the housing to permit such motion. The main gear 90 has a generally cylindrical shape and has gear teeth 92 formed therein. The main gear 90 can be formed as a spur gear as shown, or can be formed as a helical gear.

Depending on the operating position of the actuator assembly 50, the main gear 90 engages either the first or second cable assemblies 40 and 46. The first cable assembly 40 includes a rack 100 which is mounted for translational movement within an elongated groove 102 formed in the housing 54. The rack 100 preferably does not rotate within the housing 54. The rack 100 includes teeth 104 formed therein. The rack 100 can have a generally flat shape with the teeth 104 formed on the lateral edges thereof. One end of the rack 100 is connected to the inner cable 44. The rack 100 and the inner cable 44 can be connected by any suitable manner. In the embodiment shown, the inner cable 44 includes a crimp member 110 attached to the inner cable 44 and is housed within a slot 112 formed in a portion of the rack 100. The slot 112 is formed such that the crimp member 110 is trapped within the slot 112. A pinion gear 120 is housed within a slot 122 formed in the housing 54. The pinion gear 120 is mounted for rotational movement within the housing 54 along an axis defined by the length of the rack 100. The pinion gear 120 has a generally cylindrical shape and includes external teeth 124 which selectively engage with the teeth 92 of the main gear 90 depending on the position of the main gear 90. The rack 100 extends through an opening of the pinion gear 120 which has internally formed teeth 126. The teeth 126 of the pinion gear 120 engage with the teeth 102 of the rack 100. Rotation of the pinion gear 120 causes translational movement of the rack 100 within the groove 102 due to the meshing of the teeth 102 and 126.

The second cable assembly includes a rack 130 which is mounted for translational movement within an elongated groove 132 formed in said housing 54. The rack 130 preferably does not rotate within the housing 54. The rack 130 includes teeth 134 formed therein. The rack 130 can have a generally flat shape with the teeth 134 formed on the lateral edges thereof. One end of the rack 100 is connected to the inner cable 48. The rack 130 and the inner cable 48 can be connected by any suitable manner. In the embodiment shown, the inner cable 48 includes a crimp member 140 attached to the inner cable 48 and is housed within a slot 142 formed in a portion of the rack 130. The slot 142 is formed such that the crimp member 140 is trapped within the slot 142. A pinion gear 150 is housed within a slot 152 formed in the housing 54. The pinion gear 150 is mounted for rotational movement within the housing 54 along an axis defined by the length of the rack 130. The pinion gear 150 has a generally cylindrical shape and includes external teeth 154 which selectively engage with the teeth 92 of the main gear 90 depending on the position of the main gear 90 within the chamber 96. The rack 130 extends through an opening of the pinion gear 150 which has internally formed teeth 156. The teeth 156 of the pinion gear 150 engage with the teeth 132 of the rack 130. Rotation of the pinion gear 150 will cause translational movement of the rack 130 within the groove 132.

The operation of the seat 10 and actuator assembly 50 will now be described. As stated above, the actuator assembly 50 is operable for permitting independent actuation of first and second cable assemblies 40 and 46, respectively, for causing the corresponding curvature and positional adjustments of the lumbar support mechanism 16. To alter a first comfort feature, such as the curvature of the lumbar member 36, the actuator assembly 50 is placed into a first operating position, as shown in FIG. 2. In this position, the user pulls on the handle 52 to move the shaft 56 into the position as shown in FIG. 2. In this position, the tabs 72 of the fingers 70 are disposed in the slots 76 which properly positions the teeth 92 of the main gear 90 into engagement with the teeth 126 of the pinion gear 120. Note that at this position, the teeth 92 of the main gear 90 are not in engagement with the teeth 156 of the pinion gear 150. The user can now rotate the handle 52 in either rotational direction. Rotation of the handle 52 in one direction will cause the lumbar member 36 to curve outwardly, while rotation of the handle 52 in the other direction will cause the lumbar member 36 to curve inwardly. More specifically, rotation of the handle 52 causes rotation of the shaft 56 and the main gear 90. The rotation of the main gear 90 causes rotational movement of the pinion gear 120. Rotational movement of the pinion gear 120 causes the rack 100 to move in a linear manner within the groove 102 causing the inner cable 44 to be pulled or pushed. Note that the rack 100 does not rotate within the groove 102. The movement of the inner cable 44 will move the upper free end 38 of the lumbar member 36 either upwardly or downwardly relative to the frame assembly 35 depending on the direction of the movement of the rack 100 such that the lumbar member 36 will bow or deflect more outwardly or inwardly.

To alter the second comfort feature, such as the vertical location of the lumbar member 36, the actuator assembly 50 is placed into a second operating position, as shown in FIG. 3. In this position, the user pushes on the handle 52 to move the shaft 56 into the position as shown in FIG. 3. In this position, the tabs 72 of the fingers 70 are disposed in the slots 78 which properly positions the teeth 92 of the main gear 90 into engagement with the teeth 156 of the pinion gear 150. Note that at this position, the teeth 92 of the main gear 90 are not in engagement with the teeth 126 of the pinion gear 120. The user can now rotate the handle 52 in either rotational direction. Rotation of the handle 52 in one direction will cause the lumbar member 36 to move upwardly, while rotation of the handle 52 in the other direction will cause the lumbar member 36 to move downwardly. More specifically, rotation of the handle 52 causes rotation of the shaft 56 and the main gear 90. The rotation of the main gear 90 causes rotational movement of the pinion gear 150. Rotational movement of the pinion gear 150 causes the rack 130 to move in a linear manner within the groove 132 causing the inner cable 48 to be pulled or pushed relative to the sheath 49. The movement of the inner cable 48 will move the lumbar frame assembly 35 upwardly or downwardly sliding along the rails 24.

Although the invention has been shown and described as being used for altering either the curvature of the lumbar member 36 or the vertical location of the lumbar member 36, it should be understood that the actuator assembly 50 may be connected to other comfort mechanisms such as bolster adjusters, seat extenders, headrest adjustment mechanisms, and seat positioning mechanisms.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An actuator assembly for adjusting first and second comfort features of a seat assembly, the assembly comprising:
   a housing;
   a shaft mounted for linear and rotational movement in said housing;
   a main gear mounted on said shaft and mounted for rotational movement in said housing, and wherein said shaft and main gear are linearly movable between first and second positions relative to said housing;
   a first cable assembly including:
      a first pinion gear mounted for rotational movement in said housing;
      a first rack mounted for linear movement in said housing, said first rack engaged with said first pinion gear such that rotation of said first pinion gear linearly moves said first rack;
      a first cable connected to said first rack, said first cable adapted to be connected to a first comfort feature;
   a second cable assembly including:
      a second pinion gear mounted for rotational movement in said housing;
      a second rack mounted for linear movement in said housing, said second rack engaged with said second pinion gear such that rotation of said second pinion gear linearly moves said first rack;
      a second cable connected to said first rack, said cable adapted to be connected to a second comfort feature;
   wherein when said main gear is in said first position, said main gear is engaged with said first pinion gear, and when said main gear is in said second position, said main gear is engaged with said second pinion gear.

2. The assembly of claim 1, wherein said shaft includes a handle mounted thereon for manually moving said shaft between said first and second positions and rotating said main gear.

3. The assembly of claim 1, wherein when said main gear is in said first position, said main gear is disengaged with said second pinion gear.

4. The assembly of claim 1, wherein when said main gear is in said second position, said main gear is disengaged with said first pinion gear.

5. The assembly of claim 1, wherein the assembly includes a detent mechanism for biasing one of said shaft and driving gear in one of said first and second positions.

6. The assembly of claim 5, wherein said detent is a resilient spring member including a tab received in one of first and second recesses formed in said housing, wherein the position of said first and second recesses corresponds to said first and second positions.

7. The assembly of claim 6, wherein said resilient spring member is mounted on a tubular sleeve disposed about said shaft.

8. The assembly of claim 1, wherein said first and second racks are mounted in said housing such that rotation is prevented.

9. The assembly of claim 8, wherein said first and second racks are relatively flat members disposed within a groove formed in said housing.

10. The assembly of claim 1, wherein said seat assembly further includes a lumbar assembly including a lumbar member movably mounted on said seat assembly for altering the contour of a seating surface of the said seat assembly.

11. The assembly of claim 10, wherein said first comfort feature corresponds to altering the curvature of said lumbar member.

12. The assembly of claim 10, wherein said second comfort feature corresponds to moving said lumbar member in a generally vertical direction relative to said seat assembly.

13. The assembly of claim 1, wherein said main gear and said first and second pinion gears are spur gears.

14. The assembly of claim 1, wherein said first and second cables each include an outer sheath and an inner cable disposed within said sheath.

* * * * *